C. H. HALL.
LOZENGE MACHINE.

No. 183,666.  Patented Oct. 24, 1876.

Witnesses,
Chas. H. Smith
Geo. T. Pinckney

Inventor
Charles H. Hall
by L. W. Serrell, Atty

N. PETERS, PHOTO-LITHOGRAPHER, WASHINGTON, D. C.

UNITED STATES PATENT OFFICE.

CHARLES H. HALL, OF BROOKLYN, NEW YORK, ASSIGNOR TO HIMSELF AND FRANK P. TARBELL, OF NEW YORK CITY.

IMPROVEMENT IN LOZENGE-MACHINES.

Specification forming part of Letters Patent No. 183,666, dated October 24, 1876; application filed July 26, 1876.

*To all whom it may concern:*

Be it known that I, CHARLES H. HALL, of Brooklyn, E. D., in the county of Kings and State of New York, have invented an Improvement in Lozenge-Machines, of which the following is a specification:

In this machine the paste used to form the lozenges is rolled out upon an apron, and by it moved along progressively beneath typeblocks, having two or more sides that are moved around intermittently and impressed upon the paste to print names or mottoes thereon, said type-blocks being inked in such a manner that the ink will not run or blur upon the moist paste, and after the printing has been done the paste is cut by punches or cutters to form lozenges, that are conveyed away to dry and harden.

Figure 1:
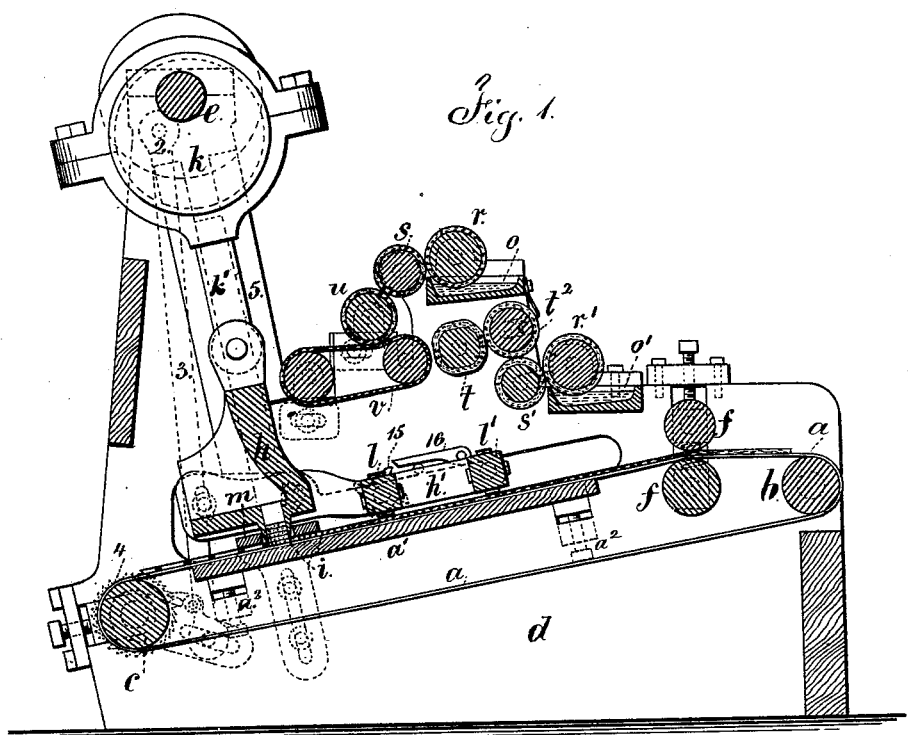
Figure 2:
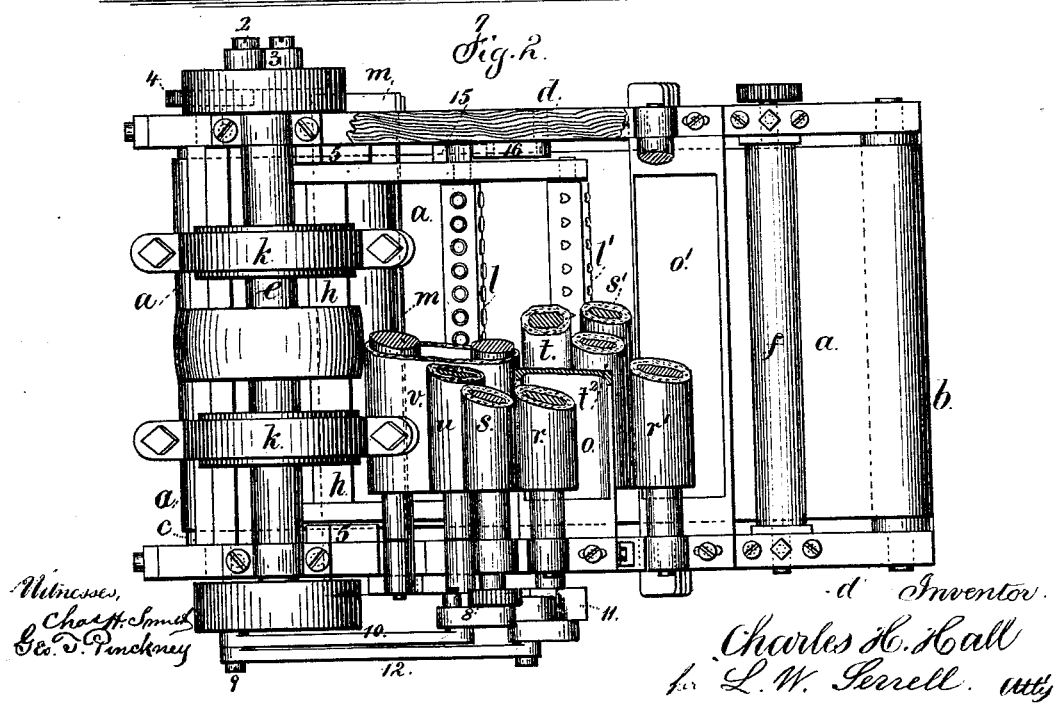

In the drawing, Figure 1 is a vertical section of the machine complete; and Fig. 2 is a plan, partially in section, of the machine.

The apron $a$ passes over the rollers $b\ c$, that are supported by the side frames $d$, and these side frames are extended up to receive the cross-shaft $e$, that is driven by competent power. A crank-pin, 2, connecting-rod 3, and pawl serve to give motion to the ratchet-wheel 4 upon the shaft of the roller $c$, in order that the belt may be moved along progressively. The paste, in a properly-mixed condition, is supplied in a thin sheet from a separate belt or pair of rollers, (not shown in the drawing,) and passes along upon the apron $a$, between the gaging-rollers $f$, that insure uniformity, or nearly so, in the thickness of the layer of paste. There is a moving head, $h$, that is sustained in vertical slides 5, and moved up and down by eccentrics $k$ on the shaft $e$ and eccentric rods $k'$, and this head $h$ has upon its lower part the cutters or punches $i$ and the printing-blocks $l\ l'$. The cutters $i$ are tubular, and of a cylindrical or polygonal form, so that they cut out the lozenges from the sheet of paste and lift them up, and the accumulation of the lozenges by the successive additions at the bottoms of the cutters causes the lozenges to be delivered at the top, and fall upon a belt or other delivering apparatus. This cutting portion of the apparatus I do not claim, as it has before been used.

I make use of a clearing-plate, $m$, that passes across above the sheet of paste, and is perforated for the passage of the cutters, so that the sheet of paste will be kept down as the cutters are lifted. Beneath the endless apron $a$ I apply an adjustable table, $a^1$, that can be raised or lowered, as a whole or in sections, by slots and screws $a^2$, so as to raise or lower the apron and insure the proper action of the cutters, and of the means for printing, hereafter described. The moving head $h$ is provided with side bars $h'$, that extend along over the apron $a$, and carry the printing-blocks $l\ l'$. These are prismatic, and I prefer to use four sides, and upon the sides are letters forming mottoes or sentences; or there may be raised designs, and these can be varied so that no two are alike, if desired; hence the lozenges produced by this machine vary in the printed surface. I remark that the lozenges may each have two or more impressions in different colors, or there may only be one impression on each lozenge.

The means that I employ for applying the coloring material or ink to the printing-blocks are as follows: The coloring material or ink is contained in the troughs $o\ o'$. This ink may be either the same or different colors, and the ink-rollers $r\ r'$ are in the troughs, and revolved by contact with the rollers $s\ s'$. The roller $s$ is revolved by a ratchet and pawl, 8, receiving motion from the crank-pin 9 and link 10, and the roller $s'$ receives motion from the roller $t$ by the intermediate roller $t^2$, and a ratchet-wheel, 11, and pawl, moved by the link 12 from the crank-pin 9. The roller $t$ is polygonal, and the intermediate roller $t^2$ is in yielding bearings, to allow the roller $t$ to be moved around each time, so that one of its flat faces is presented to the top of the revolving type-block $l'$ as the latter is raised up. The ink or color is conveyed from the roller $s$, by the intermediate roller $u$, to the belt $v$, of cloth or other flexible material, and against this belt the type-blocks $l$ are raised by the head $h$.

I remark that the ink-rollers are preferably made with a felt or cloth surface, and with oil-silk between the cloth and the wooden roller, to prevent the roller absorbing the ink.

At the end of each of the polygonal type-blocks there is a ratchet-wheel, 15, and a stationary pawl, 16, upon the frame causes these type-blocks to be turned progressively as the head $h$ is moved up and down.

By the arrangement shown the ink is applied to the top range of the type-blocks, and the inked surface is turned vertically the next movement of $h$, and is brought around into position for printing the third movement of the press. This gives time for the ink to dry on the types sufficiently to prevent blotting and running when impressed upon the moist sheet of paste.

By my improvement the printing and cutting are done in one machine in a more perfect manner than heretofore, and at a much less expense.

A third or fourth type-block might be added, and be inked with a separate color, if an additional ink-trough and rollers are provided.

I claim as my invention—

1. The reciprocating head $h$, punches $i$, and printing-blocks $l\ l'$, sustained by and moving with the head $h$, in combination with the clearing-plate $m$, apron $a$, and adjustable table $a'$, substantially as and for the purposes set forth.

2. The combination, in a lozenge-machine, of an adjustable table, the apron supported by such table, and the cutters and types for printing and cutting such lozenges, substantially as set forth.

Signed by me this 19th day of July, A. D. 1876.

CHARLES H. HALL.

Witnesses:
GEO. T. PINCKNEY,
CHAS. H. SMITH.